(12) United States Patent
Funakubo (10) Patent No.: US 8,288,021 B2
(45) Date of Patent: Oct. 16, 2012

(54) FLAT METAL PARTICLE-CONTAINING COMPOSITION AND HEAT RAY-SHIELDING MATERIAL (75) Inventor: Takeshi Funakubo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/077,234

(22) Filed: Mar. 31, 2011

(65) Prior Publication Data
US 2011/0250437 A1 Oct. 13, 2011

(30) Foreign Application Priority Data

Apr. 7, 2010 (JP) ................... 2010-088986

(51) Int. Cl.
*B32B 15/04* (2006.01)
(52) U.S. Cl. ........ 428/697; 428/401; 428/546; 428/548; 428/673
(58) Field of Classification Search .................. 428/328, 428/357, 402, 403, 434, 606, 688, 401, 546, 428/548, 673, 697
See application file for complete search history.

(56) References Cited

U.S. PATENT DOCUMENTS

| 2008/0213592 A1* | 9/2008 | Goia et al. ..................... 428/402 |
| 2009/0159858 A1* | 6/2009 | Noguchi et al. ............... 252/587 |
| 2009/0226753 A1* | 9/2009 | Naoi ............................. 428/606 |
| 2011/0111210 A1* | 5/2011 | Matsunami et al. .......... 428/328 |

FOREIGN PATENT DOCUMENTS

| JP | 3594803 B2 | 12/2004 |
| JP | 2009-127092 A | 6/2009 |
| JP | 2009-215594 A | 9/2009 |

* cited by examiner

*Primary Examiner* — Jennifer McNeil
*Assistant Examiner* — Lauren Robinson
(74) *Attorney, Agent, or Firm* — Birch, Stewart, Kolasch & Birch, LLP (57) ABSTRACT

A flat metal particle-containing composition including flat metal particles containing silver and a metal nobler than the silver, wherein the metal nobler than the silver is located near surfaces of the flat metal particles and wherein an amount of the metal nobler than the silver is $10^{-3}$ atomic % to 5 atomic % relative to the silver contained in the flat metal particles.

10 Claims, 2 Drawing Sheets

FLAT METAL PARTICLE-CONTAINING COMPOSITION AND HEAT RAY-SHIELDING MATERIAL

BACKGROUND OF THE INVENTION

1. Field of the Invention

The present invention relates to a flat metal particle-containing composition suitable to, for example, a heat ray reflection film, an infrared ray reflection film, a visible light reflection film, a heat ray absorption film, an infrared ray absorption film and a selective reflection film; and to a heat ray-shielding material selectively reflecting and absorbing heat rays.

2. Description of the Related Art

Nanoparticles have a size smaller than wavelengths of light and thus attract attention as a material with low light scattering. Among others, research has been made on metal nanoparticles in various fields, since they have electrical conductivity, thermal conductivity, favorable refractive index, catalytic activity, and other features.

For example, Japanese Patent Application Laid-Open (JP-A) No. 2009-215594 discloses that thermal stability of Ag nanowires is improved through mixing with a metal nobler than silver.

Also, JP-A No. 2009-127092 discloses that migration resistance is improved through plating of a metal other than silver.

Although these prior art documents disclose a migration inhibitor or a measure to enhance thermal stability when Ag is used as a conductive material, they neither disclose nor suggest improvement of Ag in light resistance.

Also, the transparent conductive materials disclosed in the above prior art documents utilize conductivity of silver and thus possess problematic sulfurization and oxidization. Meanwhile, in reflective materials utilizing plasmon, a small degree of oxidization or sulfurization on contact points or surfaces does not problematic. Also, other metals could not be used together with silver, since the plasmon wavelength is greatly changed by the other metals.

Moreover, Japanese Patent (JP-B) No. 3594803 discloses a paint utilizing plasmon absorption of a noble metal by mixing a noble metal colloid with a resin. JP-B No. 3594803 neither discloses nor suggests that plasmon of noble metal nanoparticles is unstable for light resistance, since a specific light resistance improver is not used in the noble metal colloid.

Therefore, at present, demand has arisen for provision of a flat metal particle-containing composition in which flat metal particles exist more stably and reduction of plasmon reflection due to light can be prevented; and a heat ray-shielding material which has high selectivity for reflection wavelength or region, has excellent transmittance with respect to visible light and radio wave, and has excellent light resistance.

BRIEF SUMMARY OF THE INVENTION

The present invention aims to provide a flat metal particle-containing composition in which flat metal particles exist more stably and reduction of plasmon reflection due to light can be prevented and which can be suitably used in, for example, a heat ray reflection film, an infrared ray reflection film, a visible light reflection film, a heat ray absorption film, an infrared ray absorption film and a selective reflection film; and a heat ray-shielding material which has high selectivity for reflection wavelength or region, has excellent transmittance with respect to visible light and radio wave, and has excellent light resistance.

The present inventors conducted studies on a reflection film utilizing plasmon reflection in order to solve the above existing problems, and have found that nanosized noble metal particles (including flat metal nanoparticles) are degraded in light resistance. One possible reason for degradation of the noble metal nanoparticles in light resistance lies in the reduction of stability due to increasing of surface energy with increasing specific surface areas. In this case, it is difficult to protect the noble metal by adding a large amount of a resin to the flat metal particle-containing composition. Thus, the present inventors conducted extensive studies, and as a result have found that by locating the metal nobler than silver in an amount of $10^{-3}$ atomic % to 5 atomic % near surfaces of flat metal nonap articles containing silver, stability of the flat metal nanoparticles is increased, reduction of plasmon reflection due to light can be prevented, and better light resistance can be attained.

The present invention is based on the above finding obtained by the present inventors. In one embodiment, the present invention provides a flat metal particle-containing composition including: flat metal particles containing silver, and a metal nobler than the silver, wherein the metal nobler than the silver is located near surfaces of the flat metal particles, and wherein an amount of the metal nobler than the silver is $10^{-3}$ atomic % to 5 atomic % relative to the silver contained in the flat metal particles.

In another embodiment of flat metal particle-containing composition, the amount of the metal nobler than the silver is $10^{-3}$ atomic % to 1 atomic % relative to the silver contained in the flat metal particles.

In one embodiment, the metal nobler than the silver is at least one selected from gold, palladium, iridium, platinum and osmium.

In a further embodiment, the metal nobler than the silver is produced through reduction by the silver.

The present invention also provides a heat ray-reflection film including the above flat metal particle-containing composition.

Additionally, the present invention provides an infrared ray-reflection film including the above described flat metal particle-containing composition.

Also provided is a heat ray-absorption film including the flat metal particle-containing composition,an infrared ray-absorption film including the flat metal particle-containing composition, a selective reflection film including the flat metal particle-containing composition, and a heat ray-shielding material including the flat metal particle-containing composition.

In one embodiment, the heat ray-shielding material further includes a substrate and a flat metal particle-containing layer on the substrate, wherein the flat metal particle-containing layer is formed of the flat metal particle-containing composition, and main planes of the flat metal particles are plane-oriented at 0° to ±30° with respect to a surface of the substrate.

In another embodiment, the heat ray-shielding material has an area ratio of 15% or higher, the area ratio being calculated by B/A×100, where A and B denote a projected area of the substrate and a total value of projected areas of the flat metal particles, respectively, when the heat ray-shielding material is viewed from a perpendicular direction.

The reason why the flat metal particle-containing composition of the present invention is increased in light stability is unclear. One possible reason is that introduction of the metal nobler than silver near the surfaces of the flat silver particles stabilizes unstable bonds on the surfaces. In addition, the most unstable silver reduces another metal (i.e., oxidized) to change into a metal nobler than silver, whereby the flat silver particles become more stable. By replacing unstable silver with a small amount of a metal nobler than silver, the unstable silver is removed from flat silver particles to change into a stable metal, whereby more stable flat silver particles can be obtained. As described above, the present invention can provide a heat ray-shielding material in which flat metal particles exist more stably is and reduction of plasmon reflection due to light can be prevented and which has high selectivity for reflection wavelength or region, has excellent transmittance with respect to visible light and radio wave, and has excellent light resistance.

The present invention can provide a flat metal particle-containing composition in which flat metal particles exist more stably and reduction of plasmon reflection due to light can be prevented and which can be suitably used in, for example, a heat ray reflection film, an infrared ray reflection film, a visible light reflection film, a heat ray absorption film, an infrared ray absorption film and a selective reflection film; and a heat ray-shielding material which has high selectivity for reflection wavelength or region, has excellent transmittance with respect to visible light and radio wave, and has excellent light resistance.

DETAILED DESCRIPTION OF THE INVENTION (Flat Metal Particle-Containing Composition)

A flat metal particle-containing composition of the present invention contains flat metal particles containing silver and a metal nobler than silver, wherein the metal nobler than silver is located near surfaces of the flat metal particles and an amount of the metal nobler than silver is small; and, if necessary, further include other ingredients.

Here, the "metal nobler than silver" refers to a "metal having a standard electrode potential higher than that of silver."

Standard electrode potentials of metals can be referred to those described in "*Kagaku Binran Kaitai 5 Han Kiso Hen II* (Manual for Chemistry 5th edition (revised), Basic II), pp. 581 to 584." The standard electrode potential of a metal varies with the types of a compound containing the metal and a compound existing therewith, and is appropriately used in consideration of the above.

The amount of the metal nobler than silver must be $10^{-3}$ atomic % to 5 atomic % relative to the silver contained in the flat metal particles. Preferably, the amount thereof is $10^{-3}$ atomic % to 1 atomic %. When the amount of the metal other than silver is smaller than $10^{-3}$ atomic %, the effects of the present invention cannot be obtained in some cases. Whereas when the amount thereof exceeds 5 atomic %, plasmon moves to broad wavelength region of light reflected, potentially leading to a decrease in reflection efficiency.

The amount of the metal other than silver contained in the flat metal particles can be measured, for example, as follows: a measurement sample is dissolved with, for example, an acid, and the resultant sample is measured for the amount of the metal other than silver using inductively coupled plasma (ICP).

The metal nobler than silver is located near surfaces of the flat metal particles containing silver.

Here, the description "near surfaces of the flat metal particles containing silver" encompasses the surfaces of the flat metal particles, a region ranging from 2 to 4 atomic layers, the case where the metal nobler than silver covers the surfaces of the flat metal particles containing silver, and the case where part of the metal nobler than silver is contained inside the flat metal particles.

When the metal other than silver is located inside the flat metal particles, formation of flat particles may be prevented and also the effects of increasing light resistance may be obtained to a less extent.

Here, whether the metal nobler than silver is located near the surfaces of the flat metal particles containing silver can be confirmed by, for example, Auge photoemission spectroscopy or XPS.

In the present invention, the amount of the metal other than silver contained in the flat metal particles and the location thereof can be controlled by appropriately selecting the concentration of a metal salt, an inorganic salt or an organic acid (or a salt thereof); the type of a solvent used for the formation of flat metal particles; the concentration of a reducing agent; the addition rate and the temperature of each chemical in a production method for the flat metal particles.

Examples of the metal nobler than silver include gold, palladium, iridium, platinum and osmium. These may be used alone or in combination. Among them, particularly preferred are palladium, gold and platinum, since their raw materials are easily obtained.

The metal nobler than silver can be located near the surfaces of the flat metal particles containing silver through photoreduction, addition of a reducing agent or chemical reduction after the formation of the flat metal particles containing silver. The metal nobler than silver is preferably produced through reduction by silver.

When the reducing agent is added simultaneously with the metal nobler than silver, the metal nobler than silver is directly reduced by the reducing agent, resulting in that the desired effects are difficult to attain. Thus, preferred is a method in which the silver is replaced with the metal nobler than silver The reduction can be performed by, for example, heating flat silver particles in a solvent containing the metal nobler than silver. By heating the solvent, the metal other than silver is reduced by silver. Furthermore, photoreduction, addition of a reducing agent, chemical reduction, etc. may be appropriately combined depending on the intended purpose.

The characteristics and composition of the metal other than silver are not particularly limited and may be appropriately selected depending on the intended purpose. Examples thereof include elemental metals, oxides, inorganic salts, organic acid compounds formed from organic acids (or salts thereon, described below.

The solvent may be heated with, for example, an oil bath, an aluminum block heater, a hot plate, an oven, an infrared ray heater, a heat roller, vapor, ultrasonic waves or microwaves. The heating temperature is preferably 30° C. to 200° C., more preferably 35° C. to 180° C.

The photoreduction is performed through irradiation of, for example, UV rays, visible light rays, electron beams or infrared rays.

Examples of the reducing agent include hydrogen gas, sodium borohydride, lithium borohydride, hydrazine, ascorbic acid, amines, thiols and polyols. The chemical reduction may be an electrolysis method.

<Flat Metal Particle>

In general, nanoparticles are classified into 0-dimensional particles (substantially spherical), 1-dimensional particles (substantially rod), 2-dimensional particles (substantially flat) and 3-dimensional particles (bulk). The flat particles belong to the 2-dimensional substantially flat particles. Considering plasmon reflection, among the flat particles, preferred are flat triangular particles, flat hexagonal particles, and disc-like particles (i.e., flat triangular or hexagonal particles whose corners have been rounded).

Also, flat particles must be used for obtaining reflectivity. When 0-dimensional particles, 1-dimensional particles or 3-dimensional particles are planarily arranged, plasmon absorption is merely observed depending on each shape, so that satisfactory reflectivity cannot be obtained. Only when 2-dimensional particles are planarily arranged, one can obtain reflectivity which is a feature of the present invention.

Figure 1A:
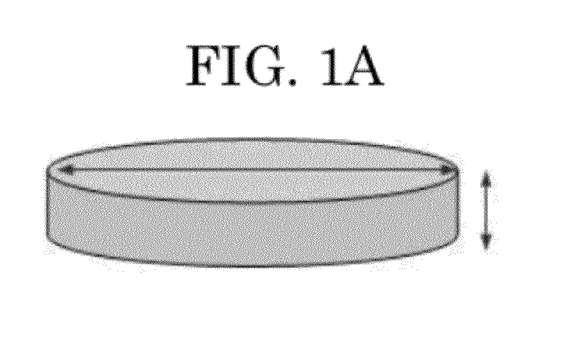
FIG. 1A is a schematic perspective view of a disc-like flat metal particle which is one exemplary flat metal particle.
Figure 1B:
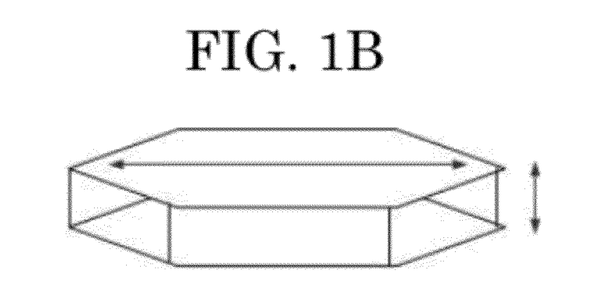
FIG. 1B is a schematic perspective view of a substantially hexagonal flat metal particle which is one exemplary flat metal particle.

The flat metal particles are not particularly limited, so long as they are particles having two main planes (see FIGS. 1A and 1B), and may be appropriately selected depending on the intended purpose. Examples thereof include substantially hexagonal particles, disc-like particles and substantially triangular particles. Among them, particularly preferred are substantially hexagonal particles and disc-like particles, since they have high transmittance with respect to visible light. Notably, in each of FIGS. 1A and 1B, a horizontal two-sided arrow indicates a diameter and a vertical two-sided arrow indicates a thickness.

The disc-like particles are not particularly limited and may be appropriately selected depending on the intended purpose, so long as they have round corners when observed from a perpendicular direction of their main plane under a transmission electron microscope (TEM).

The substantially hexagonal particles are not particularly limited and may be appropriately selected depending on the intended purpose, so long as they have a substantially hexagonal shape when observed from a perpendicular direction of their main plane under a transmission electron microscope (TEM). For example, the corners of the hexagonal shape may be sharp or dull. From the viewpoint of reducing absorption of visible light, the corners thereof are preferably dull. The extent to which the corners are dull is not particularly limited and may be appropriately selected depending on the intended purpose.

The flat metal particles contain silver. Preferably, they are flat silver particles made of silver only.

The ratio of the substantially hexagonal particles or disc-like particles is preferably 60% by number or higher, more preferably 65% by number or higher, further preferably 70% by number or higher, relative to the total number of the metal particles. When the ratio of the above flat metal particles is lower than 60% by number, transmittance with respect to visible light rays may be decreased, which is disadvantageous.

[Average Particle Diameter and Particle Size Distribution]

The average particle diameter of the flat metal particles is not particularly limited and may be appropriately selected depending on the intended purpose. It is preferably 70 nm to 500 nm, more preferably 100 nm to 400 nm. When the average particle diameter thereof is less than 70 nm, the flat metal particles exhibit high absorbance to exhibit low reflectivity, resulting in that satisfactory heat ray reflectivity cannot be obtained in some cases. When the average particle diameter thereof exceeds 500 nm, haze (scattering) becomes large, resulting in that transparency of a substrate may be degraded.

Here, the average particle diameter refers to an average value of main planes' diameters (the maximum lengths) of 200 flat particles randomly selected from an image obtained through observation of particles under a TEM.

The metal particle-containing layer may contain two or more kinds of metal particles having different average particle diameters. In this case, the metal particles may have two or more peaks of average particle diameter; i.e., may have two average particle diameters.

In the heat ray-shielding material of the present invention, variation coefficient in a particle size distribution of the flat metal particles is preferably 30% or lower, more preferably 10% or lower. When the variation coefficient exceeds 30%, the wavelength region of heat rays reflected by the heat ray-shielding material may become broad, which is disadvantageous.

Here, the variation coefficient in the particle size distribution of the flat metal particles refers to a value (%) obtained as follows. Specifically, the particle diameters of the 200 flat metal particles, which are selected for determining the average particle diameter as described above, are plotted to obtain their distribution range. Then, the standard deviation of the particle size distribution is calculated and divided by the above-obtained average particle diameter of the main planes' diameters (the maximum lengths).

[Aspect Ratio]

The aspect ratio of the flat metal particles is not particularly limited and may be appropriately selected depending on the intended purpose. The aspect ratio thereof is preferably 2 or higher, more preferably 2 to 80, further preferably 4 to 60, since high reflectivity can be obtained from a longer wavelength region of the visible light range to the near infrared region. When the aspect ratio is less than 2, reflectivity may become low or haze may become large.

The aspect ratio refers to value L/d, where L denotes an average particle diameter of flat metal particles and d denotes an average particle thickness of flat metal particles. The average particle thickness corresponds to the interdistance of the main planes of flat metal particles as shown in, for example, FIGS. 1A and 1B, and can be measured with an atomic force microscope (AFM).

The measurement method of the average particle thickness with the AFM is not particularly limited and may be appropriately selected depending on the intended purpose. For example, a particle dispersion liquid containing flat metal particles is chopped on a glass substrate, followed by drying, to thereby measure the thickness of each particle.

[Synthesis Method for Flat Metal Particles]

The synthesis method for the flat metal particles is not particularly limited, so long as substantially hexagonal or disc-like particles can be synthesized, and may be appropriately selected depending on the intended purpose. Examples thereof include liquid phase methods such as chemical reduction methods, photochemical reduction methods and electrochemical reduction methods. Among these liquid phase methods, particularly preferred are chemical reduction methods and photochemical reduction methods from the viewpoint of controlling shape and size. Furthermore, after hexagonal or triangular flat metal particles have been synthesized, they may be subjected to, for example, an etching treatment using chemical species that dissolve silver (e.g., nitric acid, sodium sulfite and halogen ions such as Br⁻ and Cl⁻) or an aging treatment with heating so as to round the corners of the hexagonal or triangular flat metal particles, whereby substantially hexagonal or disc-like flat metal particles may be produced.

In an alternative synthesis method of the flat metal particles, seed crystals are fixed in advance on a surface of a transparent substrate (e.g., a film or a glass) and then are planarily grown to form metal particles (e.g., Ag).

In the heat ray-shielding material of the present invention, flat metal particles may be subjected to a further treatment in order for the flat metal particles to have desired properties. The further treatment is not particularly limited and may be appropriately selected depending on the intended purpose. Examples thereof include formation of a high-refractive-index shell layer and addition of various additives such as a dispersant and an anti-oxidant).

—Formation of High-Refractive-Index Shell Layer—

The flat metal particles may be coated with a high-refractive-index material having high transparency with respect to visible light so as to further increase transparency with respect to visible light. Alternatively, a high-refractive-index material layer is provided at the upper or lower portion of the flat metal particle-containing layer in the present invention, preferably at the both upper and lower portions.

The high-refractive-index material is not particularly limited and may be appropriately selected depending on the intended purpose. Examples thereof include $TiO_x$, $BaTiO_3$, $ZnO$, $SnO_2$, $ZrO_2$ and $NbO_x$.

The coating method of the high-refractive-index material is not particularly limited and may be appropriately selected depending on the intended purpose. Examples thereof include a method in which a $TiO_x$ layer is formed on flat silver particles by hydrolyzing tetrabutoxytitanium as described in Langmuir, 2000, Vol. 16, pp. 2731-2735.

When it is difficult to directly form the high-refractive-index shell layer (metal oxide layer) on the flat metal particles, a $SiO_2$ or polymer shell layer may be formed on each particle in advance and the metal oxide layer may be formed on the thus-formed shell layer. When $TiO_x$ is used as a material for the high-refractive-index metal oxide layer, there is concern that $TiO_x$ degrades a matrix in which flat metal particles are dispersed, since $TiO_x$ exhibits photocatalytic activity. Thus, depending on the intended purpose, a $SiO_2$ layer may be appropriately formed after formation of a $TiO_x$ on each flat metal particle.

—Addition of Various Additives—

In the flat metal particle-containing composition of the present invention, an anti-oxidant (e.g., mercaptotetrazole or ascorbic acid) may be adsorbed onto the flat metal particles so as to prevent oxidation of the metal (e.g., silver) forming the flat metal particles. Also, an oxidation sacrificial layer (e.g., Ni) may be formed on the flat metal particles for preventing oxidation. Furthermore, the flat metal particles may be coated with a metal oxide film (e.g., $SiO_2$ film) for shielding oxygen.

Also, a dispersing agent may be used for imparting dispersibility to the flat metal particles. Examples of the dispersing agent include high-molecular-weight dispersing agents and low-molecular-weight dispersing agents containing N, S and/or P such as quaternary ammonium salts and amines.

The flat metal particle-containing composition of the present invention may appropriately contain various additives such as a surfactant, a polymerizable compound, an antioxidant, a sulfurization inhibitor, a corrosion inhibitor, a viscosity adjuster and an antiseptic agent.

In the flat metal particle-containing composition of the present invention, the flat metal particles exist more stably and reduction of plasmon reflection due to light can be prevented. Thus, the flat metal particle-containing composition can be suitably used in, for example, a heat ray reflection film, an infrared ray reflection film, a visible light reflection film, a heat ray absorption film, an infrared ray absorption film and a selective reflection film. Furthermore, the flat metal particle-containing composition has high selectivity for reflection wavelength or region, has excellent transmittance with respect to visible light and radio wave and has excellent light resistance, and thus, can be suitably used as the below-described heat ray-shielding material.

(Heat Ray-Shielding Material)

A heat ray-shielding material of the present invention contains the above-described flat metal particle-containing composition of the present invention; and, if necessary, may further contains other members.

The heat ray-shielding material includes a substrate and a flat metal particle-containing layer formed of the flat metal particle-containing composition of the present invention; and, if necessary, further includes other members.

<Flat Metal Particle-Containing Layer>

The flat metal particle-containing layer is not particularly limited and may be appropriately selected depending on the intended purpose, so long as it is formed of the flat metal particle-containing composition of the present invention and is provided on the substrate.

The flat metal particle-containing layer may be formed by coating the substrate with the flat metal particle-containing composition of the present invention. Examples of the coating method include spin coating, dip coating, extrusion coating, bar coating and die coating.

<Substrate>

The substrate is not particularly limited, so long as it is optically transparent, and may be appropriately selected depending on the intended purpose. For example, the substrate is a substrate having a visible light transmittance of 70% or higher, preferably 80% or higher, or a substrate having a high transmittance with respect to lights of the near-infrared region.

The material for the substrate is not particularly limited and may be appropriately selected depending on the intended purpose. Examples thereof include glass materials (e.g., a white glass plate and a blue glass plate), polyethylene terephthalate (PET) and triacetylcellulose (TAC).

<Other Members>

<<Protective Layer>>

The heat ray-shielding material of the present invention preferably contains a protective layer for improving the adhesion to the substrate and mechanically protecting the resultant product.

The protective layer is not particularly limited and may be appropriately selected depending on the intended purpose. The protective layer contains, for example, a binder, a surfactant and a viscosity adjuster; and, if necessary, further includes other ingredients.

—Binder—

The binder is not particularly limited and may be appropriately selected depending on the intended purpose. The binder preferably has higher transparency with respect to visible light and solar radiation. Examples thereof include acrylic resins, polyvinylbutyrals and polyvinylalcohols. Notably, when the binder absorbs heat rays, the reflection effects of the flat metal particles are disadvantageously weakened. Thus, when an intermediate layer is formed between the heat ray source and the flat metal particles, preferably, a material having no absorption of light having a wavelength of 780 nm to 1,500 nm is selected or the thickness of the protective layer is made small.

[Plane Orientation]

In one embodiment of the heat ray-shielding material of the present invention, the flat metal particles are arranged so that their mane planes are plane-oriented at a predetermined angle with respect to a surface of the substrate.

The manner in which the flat metal particles are arranged is not particularly limited and may be appropriately selected depending on the intended purpose. Preferably, the flat metal particles are arranged in substantially parallel with the substrate surface, from the viewpoint of increasing heat ray reflectivity.

The manner in which the flat metal particles are plane-oriented is not particularly limited and may be appropriately selected depending on the intended purpose, so long as main planes of the flat metal particles are in substantially parallel with the substrate surface within a predetermined angle range. The angle formed between the substrate surface and the main planes of the flat metal particles is preferably 0° to ±30°, more preferably 0° to ±20°, further preferably 0° to ±5°.

Figure 2A:
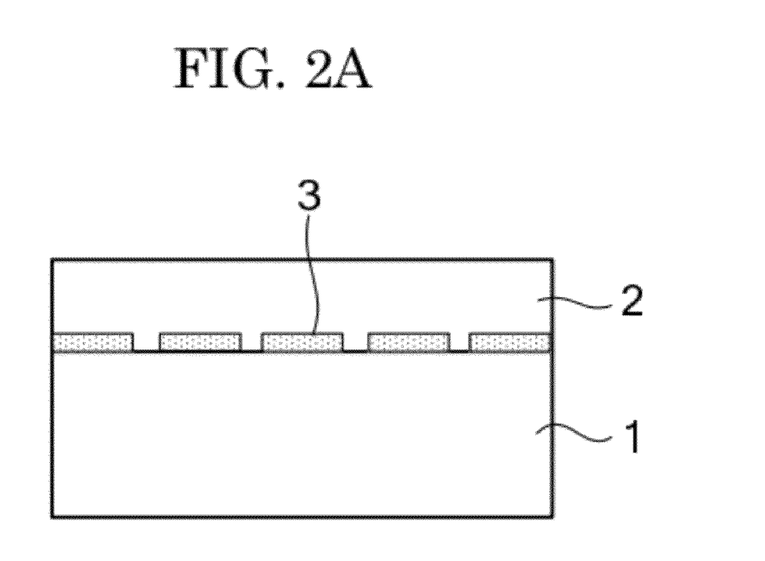
FIG. 2A is a schematic cross-sectional view of a flat metal particle-containing layer containing flat metal particles in a heat ray-shielding material of the present invention, where the flat metal particles exist in an ideal state.
Figure 2B:
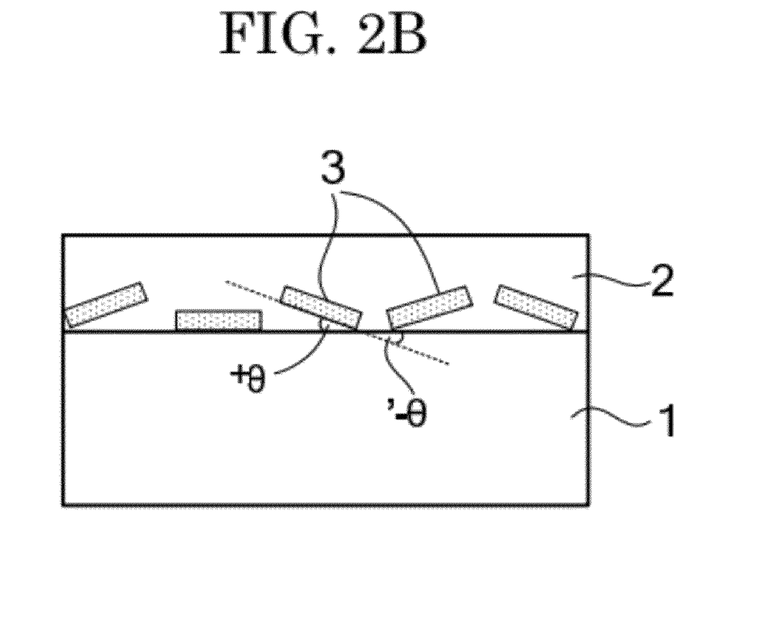
FIG. 2B is a schematic cross-sectional view of a flat metal particle-containing layer containing flat metal particles in a heat ray-shielding material of the present invention, which is for explaining angles (θ) formed between a surface of a substrate and planes of flat particles
Figure 2C:
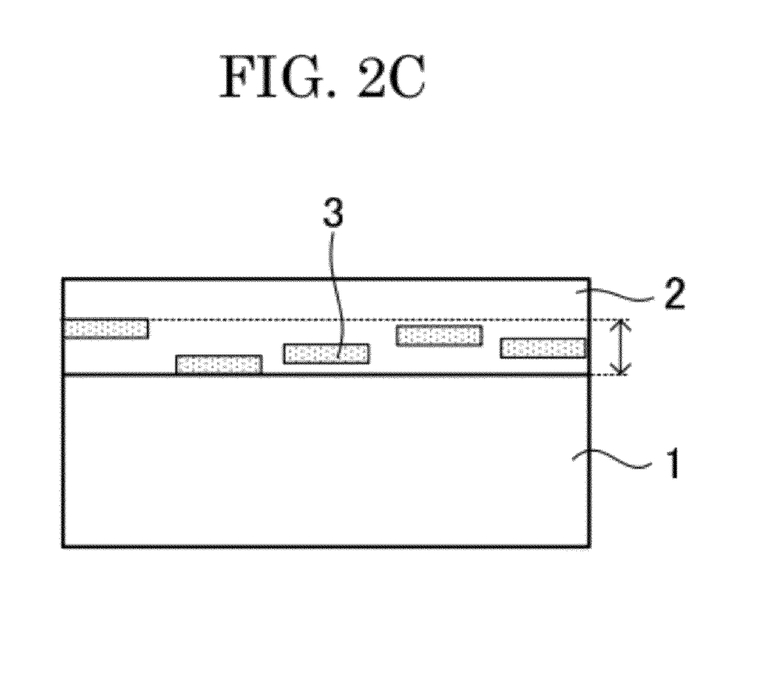
FIG. 2C is a schematic cross-sectional view of a flat metal particle-containing layer containing flat metal particles in a heat ray-shielding material of the present invention, which illustrates a region where the flat metal particles exist in a depth direction of the flat metal particle-containing layer of the heat ray-shielding material.

Here, FIGS. 2A to 2C are each a schematic cross-sectional view of the metal particle-containing layer containing the flat metal particles in a heat ray-shielding material of the present invention. FIG. 2A illustrates flat metal particles 3 existing in a flat metal particle-containing layer 2 in an ideal state. FIG. 2B explains angles (±θ) formed between a surface of a substrate 1 and planes of flat particles 3. FIG. 2C illustrates a region where flat metal particles exist in a depth direction of a flat metal particle-containing layer 2 of the heat ray-shielding material. Notably, a vertical two-sided arrow in FIG. 2C indicates a region f(λ) where the particles exist.

The above-described predetermined angle range of the plane orientation corresponds to angles (±θ) formed between the surface of the substrate 1 and the main planes of the flat metal particles 3 or extended lines of the main planes, as shown in FIG. 2B. That is, the term "plane orientation" refers to a state where the angles (±θ) shown in FIG. 2B are small when the cross section of the heat ray-shielding material is observed. In particular, FIG. 2A illustrates a state where the surface of the substrate 1 is in contact with the main planes of the flat metal particles 3; i.e., the angles θ are 0°. When the main planes of the flat metal particles 3 are plane-oriented on the surface of the substrate 1 at angles exceeding ±30°; i.e., when the angles θ shown in FIG. 2B exceed ±30°, the heat ray-shielding material has degraded reflectance to light of a predetermined wavelength (for example, from a longer wavelength region of the visible light range to the near infrared region) and exhibits large haze, which is not preferred.

[Evaluation of Plane Orientation]

The method for evaluating whether the main planes of the flat metal particles are plane-oriented on the surface of the substrate is not particularly limited and may be appropriately selected depending on the intended purpose. Examples thereof include a method including preparing appropriate cross-sectional pieces and observing the substrate and the flat metal particles in the pieces. In one specific method, the heat ray-shielding material is cut with a microtome or a focused ion beam (FIB) to prepare cross-sectional samples or cross-sectional pieces of the heat ray-shielding material; the thus-prepared samples or pieces are observed with various microscopes (e.g., a field emission scanning electron microscope (FE-SEM)); and the obtained images are used for evaluation.

When the binder covering the flat metal particles of the heat ray-shielding material is swelled with water, the cross-sectional samples or cross-sectional pieces may be prepared by freezing the heat ray-shielding material in liquid nitrogen and by cutting the resultant sample with a diamond cutter equipped with a microtome. In contrast, when the binder covering the flat metal particles of the heat ray-shielding material is not swelled with water, the cross-sectional samples or cross-sectional pieces may be prepared directly.

The method for observing the above-prepared cross-sectional samples or cross-sectional pieces is not particularly limited and may be appropriately selected depending on the intended purpose, so long as the method can determine whether or not the main planes of the flat metal particles are plane-oriented on the surface of the substrate in the samples. The observation can be performed with, for example, a FE-SEM, a TEM and an optical microscope. The cross-sectional samples may be observed with a FE-SEM and the cross-sectional pieces may be observed with a TEM. When the FE-SEM is used for evaluation, the FE-SEM preferably has a spatial resolution with which the shapes of the flat metal particles and the angles (±θ shown in FIG. 2B) can be clearly observed.

[Region where Flat Metal Particles Exist]

In the heat ray-shielding material of the present invention, as shown in FIG. 2C, the flat metal particle-containing layer 2 preferably exists within a range of (λ/n)/4 in a depth direction from the horizontal surface of the heat ray-shielding material, where λ denotes a plasmon resonance wavelength of the metal forming the flat metal particles 3 contained in the flat metal particle-containing layer 2 and n denotes a refractive index of the medium of the flat metal particle-containing layer 2. When the flat metal particle-containing layer 2 exists in a broader range than this range, the effect of strengthening the phases becomes small at the interfaces between air and the front and rear surfaces of the heat ray-shielding material, potentially leading to a decrease in visible light transmittance and the maximum reflectance to heat rays.

The plasmon resonance wavelength λ of the metal forming the flat metal particles contained in the flat metal particle-containing layer is not particularly limited and may be appropriately selected depending on the intended purpose. The plasmon resonance wavelength λ is preferably 400 nm to 2,500 nm from the viewpoint of exhibiting heat ray reflectivity. More preferably, the plasmon resonance wavelength λ is 700 nm to 2,500 nm from the viewpoint of reducing haze (scattering) of visible light.

The medium of the flat metal particle-containing layer is not particularly limited and may be appropriately selected depending on the intended purpose. Examples thereof include polyvinylacetal resins, polyvinylalcohol resins, polyvinylbutyral resins, polyacrylate resins, polymethyl methacrylate resins, polycarbonate resins, polyvinyl chloride resins, saturated polyester resins, polyurethane resins, polymers such as naturally occurring polymers (e.g., gelatin and cellulose) and inorganic compounds (e.g. silicon dioxide and aluminum oxide).

The refractive index n of the medium is preferably 1.4 to 1.7.

[Area Ratio of Flat Metal Particles]

When A and B denote respectively a projected area of the substrate and the io total value of projected areas of the flat metal particles when the heat ray-shielding material is viewed from a perpendicular direction, the area ratio of (B/A)×100 is preferably 15% or higher, more preferably 20% or higher. When the area ratio is lower than 15%, the maximum reflectivity to heat rays is decreased, resulting in that satisfactory heat-shielding effects cannot be obtained in some cases.

The area ratio can be measured, for example, as follows. Specifically, the heat ray-shielding material is observed under a SEM or an AFM (atomic force microscope) and the resultant image is subjected to image processing.

[Average Interparticle Distance between Flat Metal Particles]

In the flat metal particle-containing layer, the average interparticle distance between the flat metal particles neighboring in a horizontal direction is preferably equal to or larger than 1/10 the average particle diameter of the flat metal particles from the viewpoint of obtaining desired visible light transmittance and the maximum reflectance to heat rays.

When the average interparticle distance of the flat metal particles in a horizontal direction is lower than 1/10 the average particle diameter of the flat metal particles, the maximum reflectance to heat rays is disadvantageously decreased. Also, the average interparticle distance in a horizontal direction is preferably ununiform (random) from the viewpoint of obtaining visible light transmittance. When the average interparticle distance is not random; i.e., uniform, the metal particle-containing layer absorbs visible light, resulting in that its transmittance may be decreased.

Here, the average interparticle distance of the flat metal particles in a horizontal direction refers to an average value of interparticle distances between two neighboring particles. Also, the description "the average interparticle distance is random" means that there is no significant local maximum point except for the origin in a two-dimensional autocorrelation of brightness values when binarizing a SEM image containing 100 or more of flat metal particles.

[Interdistance between Neighboring Flat Metal Particle-Containing Layers]

In the heat ray-shielding material of the present invention, the flat metal particles are arranged in the form of the flat metal particle-containing layer containing the flat metal particles, as shown in FIGS. 2A to 2C.

The flat metal particle-containing layer may be a single layer as shown in FIGS. 2A to 2C. Alternatively, two or more of the flat metal particle-containing layer may be provided. Provision of two or more of the flat metal particle-containing layer attains desired shielding of light of a desired wavelength region.

The production method for the heat ray-shielding material of the present invention is not particularly limited and may be appropriately selected depending on the intended purpose. In one employable method, a substrate is coated with a dispersion liquid containing the flat metal particles using, for example, a dip coater, a die coater, a slit coater, a bar coater or a gravure coater. In another employable method, the flat metal particles are plane-oriented by, for example, an LB film method, a self-organizing method and a spray method.

Also, a method utilizing electrostatic interactions may be applied to plane orientation in order to increase adsorbability or plane orientability of the flat metal particles on the substrate surface. Specifically, when the surfaces of the flat metal particles are negatively charged (for example, when the flat metal particles are dispersed in a negatively chargeable medium such as citric acid), the substrate surface is positively charged (for example, the substrate surface is modified with an amino group, etc.) to electrostatically enhance plane orientability. Also, when the surfaces of the flat metal particles are hydrophilic, the substrate surface may be provided with a sea-island structure having hydrophilic and hydrophobic regions using, for example, a block copolymer or a micro contact stamp, to thereby control the plane orientability and the interparticle distance of the flat metal particles utilizing hydrophilic-hydrophobic interactions.

Notably, the coated flat metal particles are allowed to pass through pressure rollers (e.g., calender rollers or rami rollers) to promote their plane orientation.

The solar reflectance of the heat ray-shielding material of the present invention is preferably maximal in the range of 600 nm to 2,000 nm (preferably 700 nm to 1,600 nm) from the viewpoint of increasing efficiency of heat ray reflection.

The heat ray-shielding material of the present invention preferably has a visible light transmittance of 60% or higher. When the visible light transmittance thereof is lower than 60%, one may difficult to see through automotive glass or building glass using the heat ray-shielding material.

The heat ray-shielding material of the present invention preferably has a haze of 20% or lower. When the haze thereof exceeds 20%, one may difficult to see through automotive glass or building glass using the heat ray-shielding material, which is not preferred in terms of safety.

The usage form of the heat ray-shielding material of the present invention is not particularly limited and may be appropriately selected depending on the intended purpose. Examples thereof include vehicles' glass or films, building glass or films and agricultural films. Among them, the heat ray-shielding material is preferably used as vehicles' glass or films and building glass or films in terms of energy saving.

Notably, in the present invention, heat rays (near infrared rays) refer to near infrared rays (780 nm to 2,500 nm) accounting for about 50% of sunlight.

The production method for the glass is not particularly limited and may be appropriately selected depending on the intended purpose. In one employable method, the heat ray-shielding material produced in the above-described manner is provided with an adhesive layer, and the resultant laminate is attached onto vehicle's glass (e.g., automotive glass) or building glass or is inserted together with a PVB or EVA intermediate film used in laminated glass. Alternatively, only particle/binder layer may be transferred onto a PVB or EVA intermediate film; i.e., the substrate may be peeled off in use.

EXAMPLES

The present invention will next be described by way of Examples, which should not be construed as limiting the present invention thereto.

Production Example 1

<Production of Flat Silver Particles 1>
—Synthesis Step of Flat Nuclear Particles—

A 0.5 g/L aqueous polystyrenesulfonic acid solution (2.5 mL) was added to a 2.5 mM aqueous sodium citrate solution (50 mL), followed by heating to 35° C. Then, a 10 mM sodium borohydride solution (3 mL) was added to the resultant solution. Next, a 0.5 mM aqueous silver nitrate solution (50 mL) was added thereto at 20 mL/min under stirring. This solution was stirred for 30 min to prepare a seed particle solution.

—First Growth Step of Flat Silver Particles—

Ion-exchanged water (87.1 mL) was added to a 2.5 mM aqueous sodium citrate solution (132.7 mL), followed by heating to 35° C. Subsequently, a 10 mM aqueous ascorbic acid solution (2 mL) was added to the resultant solution and then 38.2 mL of the above-prepared seed particle solution was added thereto. Further, a 0.5 mM aqueous silver nitrate solution (79 6 mL) was added thereto at 10 mL/min under stirring.

—Second Growth Step of Flat Silver Particles—

The above-obtained solution was stirred for 30 min, and then a 0.35 M aqueous potassium hydroquinonesulfonate solution (71.1 mL) was added thereto. Further, 200 g of a 7% by mass aqueous gelatin solution was added thereto. Separately, 0.25 M aqueous sodium sulfite solution (107 mL) and a 0.47 M aqueous silver nitrate solution (107 mL) were mixed together to prepare a mixture containing white precipitates. The thus-prepared mixture was added to the solution to which the aqueous gelatin solution had been added. Immediately after the addition of the mixture containing white precipitates, a 0.17 M aqueous NaOH solution (72 mL) was added to the resultant mixture. Here, the aqueous NaOH solution was added thereto at an addition rate adjusted so that the pH of the mixture did not exceed 10. The thus-obtained mixture was stirred for 300 min to prepare dispersion liquid 1 of flat silver particles.

The obtained flat silver particle dispersion liquid 1 was found to contain hexagonal flat silver particles 1. Also, the obtained flat silver particles 1 were measured for average particle diameter, average thickness and aspect ratio, which were found to be 230 nm, 15 nm and 15.3, respectively.

Notably, the average particle diameter, average thickness and aspect ratio of each of the below-described flat metal particles 2 to 13 were found to be the same as those of flat silver particles 1. This is likely because the amount of the metal other that silver added to flat silver particles 1 is very small and reaction occurs near their surfaces only.

—Average Particle Diameter and Variation Coefficient—

The average particle diameter of the flat silver particles was obtained as follows. Specifically, 200 particles were randomly selected from the SEM image observed. Then, image processing was performed on their shapes, with A and B corresponding respectively to substantially hexagonal or disc-like particles and amorphous particles (e.g., drop-like particles). Subsequently, particles corresponding to A were measured for equivalent circle diameter with a digital caliper. The average value of the equivalent circle diameters was defined as an average particle diameter. Moreover, the standard deviation of the equivalent circle diameters was divided by the average particle diameter to obtain variation coefficient (%).

—Average Particle Thickness—

The dispersion liquid containing flat silver particles was dropped on a glass substrate, followed by drying. Then, the thickness of each flat silver particle was measured with an atomic force microscope (AFM) (Nanocute II, product of Seiko Instruments Inc.). Notably, the measurement conditions of AFM were as follows: self-detection sensor, DFM mode, measurement range: 5 µm, scanning speed: 180 sec/frame and the number of data: 256×256.

—Aspect Ratio—

The average particle diameter was divided by the average particle thickness to obtain an aspect ratio of the obtained flat silver particles (average particle diameter/average particle thickness).

—Preparation of Demineralized Flat Particle Dispersion Liquid 1—

First, 1 N NaOH (0.75 mL) was added to the flat silver particle dispersion liquid 1 (16 mL). With the temperature being maintained at 40° C., the resultant mixture was centrifugated with a centrifuge (product of KOKUSAN Co., Ltd., H-200N, Angle Rotor BN) at 8,000 rpm for 10 min, to thereby precipitate hexagonal flat silver particles. The supernatant after the centrifugation was removed and then water (5 mL) was added thereto to re-disperse the precipitated hexagonal flat silver particles. Through the above procedure, demineralized flat particle dispersion liquid 1 containing flat silver particles 1 was prepared.

Production Example 2

—Preparation of Demineralized Flat Particle Dispersion Liquid 2—

The procedure of Production Example 1 was repeated, except that in addition to the 0.47 M aqueous silver nitrate solution, an aqueous chloroauric acid solution (final concentration: 0.47 mM) was added at the second growth step of the flat silver particles 1, to thereby produce demineralized flat particle dispersion liquid 2 containing flat metal particles 2.

Production Example 3

—Preparation of Demineralized Flat Particle Dispersion Liquid 3—

The procedure of Production Example 1 was repeated, except that an aqueous chloroauric acid solution was added to the demineralized flat particle dispersion liquid 1 of Production Example 1 in an amount of $10^{-6}$ mole relative to 1 mole of the silver, to thereby produce demineralized flat particle dispersion liquid 3 containing flat metal particles 3.

Production Example 4

—Preparation of Demineralized Flat Particle Dispersion Liquid 4—

The procedure of Production Example 1 was repeated, except that an aqueous chloroauric acid solution was added to the demineralized flat particle dispersion liquid 1 of Production Example 1 in an amount of $10^{-5}$ mole relative to 1 mole of the silver, to thereby produce demineralized flat particle dispersion liquid 4 containing flat metal particles 4.

Production Example 5

—Preparation of Demineralized Flat Particle Dispersion Liquid 5—

The procedure of Production Example 1 was repeated, except that an aqueous chloroauric acid solution was added to the demineralized flat particle dispersion liquid 1 of Production Example 1 in an amount of $10^{-4}$ mole relative to 1 mole of the silver, to thereby produce demineralized flat particle dispersion liquid 5 containing flat metal particles 5.

Production Example 6

—Preparation of Demineralized Flat Particle Dispersion Liquid 6—

The procedure of Production Example 1 was repeated, except that an aqueous chloroauric acid solution was added to the demineralized flat particle dispersion liquid 1 of Production Example 1 in an amount of $10^{-3}$ mole relative to 1 mole of the silver, to thereby produce demineralized flat particle dispersion liquid 6 containing flat metal particles 6.

Production Example 7

—Preparation of Demineralized Flat Particle Dispersion Liquid 7—

The procedure of Production Example 1 was repeated, except that an aqueous chloroauric acid solution was added to the demineralized flat particle dispersion liquid 1 of Production Example 1 in an amount of $10^{-2}$ mole relative to 1 mole of the silver, to thereby produce demineralized flat particle dispersion liquid 7 containing flat metal particles 7.

Production Example 8

—Preparation of Demineralized Flat Particle Dispersion Liquid 8—

The procedure of Production Example 1 was repeated, except that an aqueous chloroauric acid solution was added to the demineralized flat particle dispersion liquid 1 of Production Example 1 in an amount of $10^{-1}$ mole relative to 1 mole of the silver, to thereby produce demineralized flat particle dispersion liquid 8 containing flat metal particles 8.

Production Example 9

—Preparation of Demineralized Flat Particle Dispersion Liquid 9—

The procedure of Production Example 1 was repeated, except that an aqueous copper(II) sulfate pentahydrate solution was added to the demineralized flat particle dispersion liquid 1 of Production Example 1 in an amount of $10^{-3}$ moles relative to 1 mole of the silver, to thereby produce demineralized flat particle dispersion liquid 9 containing flat metal particles 9.

Production Example 10

—Preparation of Demineralized Flat Particle Dispersion Liquid 10—

The procedure of Production Example 1 was repeated, except that an aqueous hexachloroplatinic acid solution was added to the demineralized flat particle dispersion liquid 1 of Production Example 1 in an amount of $10^{-3}$ mole relative to 1 mole of the silver, to thereby produce demineralized flat particle dispersion liquid 10 containing flat metal particles 10.

Production Example 11

—Preparation of Demineralized Flat Particle Dispersion Liquid 11—

The procedure of Production Example 1 was repeated, except that an aqueous sodium hexachloropalladate solution was added to the demineralized flat particle dispersion liquid 1 of Production Example 1 in an amount of $10^{-3}$ mole relative to 1 mole of the silver, to thereby produce demineralized flat particle dispersion liquid 11 containing flat metal particles 11.

Production Example 12

—Preparation of Demineralized Flat Particle Dispersion Liquid 12—

The procedure of Production Example 1 was repeated, except that an aqueous chloroauric acid solution was added to the demineralized flat particle dispersion liquid 1 of Production Example 1 in an amount of $3 \times 10^{-2}$ mole relative to 1 mole of the silver, to thereby produce demineralized flat particle dispersion liquid 12 containing flat metal particles 12.

Production Example 13

—Preparation of Demineralized Flat Particle Dispersion Liquid 13—

The procedure of Production Example 1 was repeated, except that an aqueous chloroauric acid solution was added to the demineralized flat particle dispersion liquid 1 of Production Example 1 in an amount of $10^{-3}$ mole relative to 1 mole of the silver and that ascorbic acid was added thereto in an amount by mole three times the amount of the chloroauric acid, to thereby produce demineralized flat particle dispersion liquid 13 containing flat metal particles 13.

Production Example 14

—Preparation of Silver Nanorod Dispersion Liquid 1—

Referring to "ACSNANO Vol. 3, No. 1., pp. 21-26," silver nanorod dispersion liquid 1 containing silver nanorods 1 was produced. The produced silver nanorods 1 were found to have an average major axis of 250 nm, an average minor axis of 42 nm and an aspect ratio (major axis/minor axis) of 6.

Production Example 15

—Preparation of Metal Nanorod Dispersion Liquid 2—

The procedure of Production Example 14 was repeated, except that an aqueous chloroauric acid solution was added to silver nanorods 1 one week after in an amount of 1 atomic % relative to Ag, followed by stirring at room temperature for 30 min, to thereby produce metal nanorod dispersion liquid 2 containing metal nanorods 2.

<Amount of Metal Other than Silver Contained in Flat Metal Particles>

The amount of the metal other than silver contained in the flat metal particles or metal nanorods was measure as follows. Specifically, the above-produced flat metal particles and metal nanorods were dissolved with aqua regia, and the resultant solution was measured using ICP (inductively coupled plasma). The results are shown in Table 2-1.

Example 1

Heat ray-shielding materials of sample Nos. 101 to 115 as shown in Table 2-1 were produced as follows.

<Sample No. 101>

—Production of a Heat Ray-Shielding Material—

After adjusting the concentration of demineralized flat particle dispersion liquid 1 of Production Example 1, 1 6 mL of a 2% by mass solution of the below compound W-1 in water/methanol (1/1), to thereby prepare a coating liquid. A polyethylene terephthalate (PET) film was coated with the thus-prepared coating liquid using a wire coating bar No. 14, followed by drying, to thereby obtain a film on which hexagonal flat silver particles 1 were fixed.

The hexagonal flat silver particles 1 were fixed on the PET film without aggregation. Through the above procedure, a heat ray-shielding material of sample No. 101 was produced.

W-1

<Sample Nos. 102 to 115>

The procedure of sample No. 101 was repeated, except that demineralized flat particle dispersion liquid 1 of Production Example 1 was changed to each of dispersion liquids 2 to 15 of Production Examples 2 to 15, to thereby produce heat ray-shielding materials of sample Nos. 102 to 115.

Next, each of the thus-produced heat ray-shielding materials was evaluated for various properties as follows. The results are shown in Tables 2-1 to 2-3.

<<Evaluation of Heat Ray-Shielding Material>>

—Visible Light Transmission Spectrum and Heat Ray Reflection Spectrum—

Each of the produced heat ray-shielding materials was measured for transmission spectrum and reflection spectrum according to the JIS evaluation standard for automotive glass.

The transmission and reflection spectra were evaluated with a UV-Vis near infrared spectrophotometer (product of JASCO Corporation, V-670). The evaluation was performed using an absolute reflectance measurement unit (ARV-474, product of JASCO Corporation). Here, incident light was caused to pass through a 45° polarization plate so as to become substantially non-polarized light.

—Infrared Ray Maximum Reflectance-Visible Light Transmittance—

The heat ray maximum reflectance was measured according to the method of JIS-R3106: 1998 "Testing method on transmittance, reflectance and emittance of flat glasses and evaluation of solar heat gain coefficient." After initial measurement ranging from 300 nm to 2,100 nm, the maximum reflectance was defined as the infrared ray maximum reflectance. Specifically, using SUPER XENON WEATHER METER SX-75 (product of Suga Test Instruments Co., Ltd.), each heat ray-shielding material was irradiated with xenon light for 4 weeks under the conditions: 180 W/m², black panel temperature: 63° C. and humidity: 25% RH, and then the maximum reflectance of the material was defined as the infrared ray maximum reflectance.

Meanwhile, the visible light transmittance was measured as follows. Each heat ray-shielding material was measured for transmittance with respect to each wavelength ranging from 380 nm to 780 nm, and the thus-measured transmittances were corrected with the luminosity factor of each wavelength.

—Measurement of Haze Value—

Using a haze meter (NDH-5000, NIPPON DENSHOKU INDUSTRIES CO., LTD.), each heat ray-shielding material was measured for haze value (%).

—Surface XPS Measurement (Location of the Other Metal)—

Through XPS measurement of the surfaces of the flat metal particles, 90% or higher of the metal nobler than Ag was localized near the surfaces of flat metal particles 3 to 13 and metal nanorods 2, but in flat metal particles 2, Au was not observed; i.e., located inside the particles.

<Area ratio>

Each of the obtained heat ray-shielding materials was observed under a scanning electron microscope (SEM). The obtained SEM image was binarized to determine an area ratio of (B/A)×100, where A and B denote respectively a projected area of the substrate and the total value of projected areas of the flat metal particles when the heat ray-shielding material is viewed from a perpendicular direction.

<Plane Orientation (Tilt Angle of Flat Metal Particles)>

Each of the obtained heat ray-shielding materials was embedded in an epoxy resin, followed by freezing in liquid nitrogen. In this state, the freezed product was cut with a razor to prepare a vertically cross-sectional sample of the heat ray-shielding material. The thus-prepared vertically cross-sectional sample was observed under a scanning electron microscope (SEM). Then, 100 flat metal particles were examined for tilt angle with respect to the horizontal surface of the substrate, to calculate the average tilt angle of the flat metal particles.

TABLE 2-1

| Sample No. | Metal particles | Metal other than silver | Amount mol/molAg | Atomic % | Location of other metal | Reflection peak wavelength (nm) | |
|---|---|---|---|---|---|---|---|
| 101 | Flat particles 1 | — | — | — | — | 1023 | Comp. Ex. |
| 102 | Flat particles 2 | Au | $10^{-3}$ | $10^{-1}$ | Inside | 1018 | Comp. Ex. |
| 103 | Flat particles 3 | Au | $10^{-6}$ | $10^{-4}$ | Outermost | 1023 | Comp. Ex. |
| 104 | Flat particles 4 | Au | $10^{-5}$ | $10^{-3}$ | Outermost | 1020 | Present Invention |
| 105 | Flat particles 5 | Au | $10^{-4}$ | $10^{-2}$ | Outermost | 1023 | Present Invention |
| 106 | Flat particles 6 | Au | $10^{-3}$ | $10^{-1}$ | Outermost | 1031 | Present Invention |
| 107 | Flat particles 7 | Au | $10^{-2}$ | 1 | Outermost | 1100 | Comp. Ex. |
| 108 | Flat particles 8 | Au | $10^{-1}$ | 10 | Outermost | 1800 | Comp. Ex. |
| 109 | Flat particles 9 | Cu | $10^{-3}$ | $10^{-1}$ | Outermost | 1055 | Comp. Ex. |
| 110 | Flat particles 10 | Pt | $10^{-3}$ | $10^{-1}$ | Outermost | 1015 | Present Invention |
| 111 | Flat particles 11 | Pd | $10^{-3}$ | $10^{-1}$ | Outermost | 1018 | Present Invention |
| 112 | Flat particles 12 | Au | $3 \times 10^{-2}$ | 3 | Outermost | 1158 | Comp. Ex. |
| 113 | Flat particles 13 | Au | $10^{-3}$ | $10^{-1}$ | Outermost | 1023 | Present Invention |
| 114 | Rods 1 | — | — | — | — | 983 | Comp. Ex. |
| 115 | Rods 2 | Au | $10^{-3}$ | $10^{-1}$ | Outermost | 992 | Comp. Ex. |

TABLE 2-2

| Sample No. | Reflection peak intensity Initial | Visible light transmittance (%) Initial | Haze value (%) | Reflection peak intensity Post-Xe irradiation | Peak ratio Post-irradiation/ Initial | |
|---|---|---|---|---|---|---|
| 101 | 48 | 85 | 2.3 | 30 | 63% | Comp. Ex. |
| 102 | 45 | 83 | 2.2 | 31 | 69% | Comp. Ex. |
| 103 | 48 | 85 | 2.3 | 32 | 67% | Comp. Ex. |
| 104 | 49 | 86 | 2.3 | 45 | 92% | Present Invention |

TABLE 2-2-continued

| Sample No. | Reflection peak intensity Initial | Visible light transmittance (%) | Haze value (%) | Reflection peak intensity Post-Xe irradiation | Peak ratio Post-irradiation/ Initial | |
|---|---|---|---|---|---|---|
| 105 | 50 | 84 | 2.2 | 48 | 96% | Present Invention |
| 106 | 49 | 84 | 2.3 | 48 | 98% | Present Invention |
| 107 | 42 | 80 | 2.2 | 42 | 100% | Comp. Ex. |
| 108 | 15 | 65 | 5.8 | 15 | 100% | Comp. Ex. |
| 109 | 43 | 80 | 7.3 | 29 | 67% | Comp. Ex. |
| 110 | 48 | 85 | 2.2 | 47 | 98% | Present Invention |
| 111 | 47 | 84 | 2.4 | 48 | 102% | Present Invention |
| 112 | 38 | 70 | 3.3 | 35 | 100% | Comp. Ex. |
| 113 | 49 | 84 | 2.2 | 44 | 90% | Present Invention |
| 114 | 8 | 82 | 1.8 | 8 | 100% | Comp. Ex. |
| 115 | 9 | 82 | 1.9 | 9 | 100% | Comp. Ex. |

TABLE 2-3

| Sample No. | Tilt angle (°) of flat metal particles | Area ratio (%) | |
|---|---|---|---|
| 101 | 3.8 | 40 | Comp. Ex. |
| 102 | 4.2 | 41 | Comp. Ex. |
| 103 | 4.3 | 41 | Comp. Ex. |
| 104 | 4.3 | 42 | Present Invention |
| 105 | 4.0 | 40 | Present Invention |
| 106 | 4.0 | 40 | Present Invention |
| 107 | 3.9 | 41 | Comp. Ex. |
| 108 | 4.3 | 42 | Comp. Ex. |
| 109 | 4.2 | 41 | Comp. Ex. |
| 110 | 4.4 | 41 | Present Invention |
| 111 | 3.9 | 42 | Present Invention |
| 112 | 4.1 | 43 | Comp. Ex. |
| 113 | 4.2 | 40 | Present Invention |
| 114 | — | 19 | Comp. Ex. |
| 115 | — | 19 | Comp. Ex. |

As is clear from Table 2-2, the heat ray-shielding materials of the present invention were found to exhibit higher infrared ray reflectance than in Comprataive Examples. In addition, the heat ray-shielding materials of the present invention were found to be reduced in infrared ray reflectance after Xe irradiation to a less extent than in Comparative Examples.

In the flat metal particle-containing composition of the present invention, the flat metal particles exist more stably and reduction of plasmon reflection due to light can be prevented. Thus, the flat metal particle-containing composition can be suitably used in, for example, a heat ray reflection film, an infrared ray reflection film, a visible light reflection film, a heat ray absorption film, an infrared ray absorption film and a selective reflection film Furthermore, the heat ray-shielding material of the present invention has high selectivity for reflection wavelength or region, has excellent transmittance with respect to visible light and radio wave and has excellent light resistance, and thus, can be suitably used as various members required for shielding heat rays, such as glass of vehicles (e.g., automobiles and buses), building glass and agricultural films.

What is claimed is:

1. A flat metal particle-containing composition comprising:
    flat metal particles containing silver, and
    a metal nobler than the silver,
    wherein the metal nobler than the silver is located near surfaces of the flat metal particles and is at least one selected from the group consisting of gold, iridium, platinum and osmium,
    wherein an amount of the metal nobler than the silver is $10^{-3}$ atomic % to 1 atomic % relative to the silver contained in the flat metal particles, and
    wherein the flat metal particles have an aspect ratio of 2 or higher.

2. The flat metal particle-containing composition according to claim 1, wherein the metal nobler than the silver is produced through reduction by the silver.

3. The flat metal particle-containing composition according to claim 1, wherein the flat metal particle-containing composition is used for a heat ray reflection film, an infrared ray reflection film, a heat ray absorption film, an infrared ray absorption film or a selective reflection film.

4. The flat metal particle-containing composition according to claim 1, wherein the flat metal particles containing silver have an average particle diameter as a maximum length of 70 nm to 500 nm.

5. The flat metal particle-containing composition according to claim 1, wherein the amount of the metal nobler than the silver is $10^{-3}$ atomic % to $10^{-1}$ atomic %.

6. A heat ray-shielding material comprising:
    a flat metal particle-containing composition which comprises flat metal particles containing silver and a metal nobler than the silver,
    wherein the metal nobler than the silver is located near surfaces of the flat metal particles and is at least one selected from the group consisting of gold, iridium, platinum and osmium, and
    wherein an amount of the metal nobler than silver is $10^{-3}$ atomic % to 1 atomic % relative to the silver contained in the flat metal particles.

7. The heat ray-shielding material according to claim 6, further comprising a substrate and a flat metal particle-containing layer on the substrate, wherein the flat metal particle-containing layer is formed of the flat metal particle-containing composition, and main planes of the flat metal particles are plane-oriented at 0° to ±30° with respect to a surface of the substrate.

8. The heat ray-shielding material according to claim 7, wherein the heat ray-shielding material has an area ratio of 15% or higher, the area ratio being calculated by b/a ×100, where a and b denote a projected area of the substrate and a total value of projected areas of the flat metal particles, respectively, when the heat ray-shielding material is viewed from a perpendicular direction.

9. The heat ray-shielding material according to claim 6, wherein the flat metal particles containing silver have an average particle diameter as a maximum length of 70 nm to 500 nm.

10. The heat ray-shielding material according to claim 6, wherein the amount of the metal nobler than the silver is $10^{-3}$ atomic % to $10^{-1}$ atomic %.

* * * * *